United States Patent Office 3,714,233
Patented Jan. 30, 1973

3,714,233
HALOALKOXY- AND HALOALKYLTHIO-PHENYL CARBAMATES
Eric R. Larsen, Lennon H. McKendry, and Fred Y. Edamura, Midland, Mich., assignors to The Dow Chemical Company, Midland, Mich.
No Drawing. Filed Feb. 1, 1971, Ser. No. 111,686
Int. Cl. C07c *125/06, 155/02, 155/04*
U.S. Cl. 260—479 C                    7 Claims

ABSTRACT OF THE DISCLOSURE

Novel haloalkoxy- and haloalkylthio-phenyl carbamates corresponding to the formula:

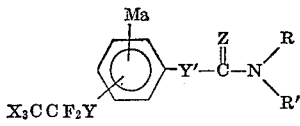

wherein
each X independently represents hydrogen, bromo, chloro or fluoro, with the proviso that at least one X is always bromo, chloro or fluoro;
Y, Y' and Z each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
R and R' each independently represents hydrogen or loweralkyl containing from 1 to about 4 carbon atoms, both inclusive.

The compounds of the present invention are suitable for use as herbicides, fungicides and insecticides.

SUMMARY OF THE INVENTION

The present invention is directed to a series of novel haloalkoxy- and haloalkylthio- phenyl carbamates corresponding to the formula:

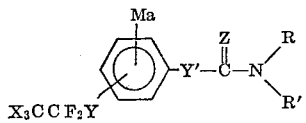

wherein
each X independently represents hydrogen, bromo, chloro fluoro, with the proviso that at least one X is always bromo, chloro or fluoro;
Y, Y' and Z each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
R and R' each independently represents hydrogen or loweralkyl containing from 1 to about 4 carbon atoms, both inclusive.

As used herein, the term "loweralkyl" means saturated, monovalent aliphatic radicals, including straight and branched-chain radicals of from 1 to about 4 carbon atoms, as illustrated by, but not limited to, methyl, ethyl, propyl, isopropyl, butyl, sec-butyl and the like.

The products of the present invention are oils or crystalline solids at room temperature, of low solubility in water and of varying degrees of solubility in many common organic solvents. The compounds of the present invention are suitable for use as herbicides, fungicides and insecticides.

The novel compounds of the present invention, wherein R' is hydrogen, are generally prepared by reacting isocyanic acid or a substituted iso- or isothio-cyanate compound of the formula:

with a haloalkoxy- or haloalkylthio-phenol or thiophenol compound corresponding to the formula:

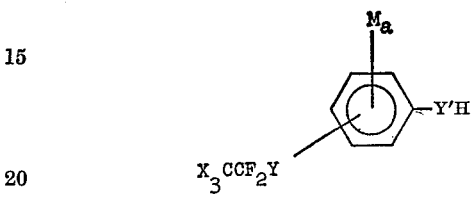

wherein X, Y, Y', Z, R, M and $a$ are as previously defined.

The reaction is conveniently carried out in an inert solvent which serves as a carrier medium. Representative inert solvents operable as carrier media in the present invention include acetonitrile, carbon tetrachloride, dimethylformamide, chloroform, acetone, benzene, ethyl acetate and the like. In order to decrease reaction time, a small amount of an actuating agent, e.g., di-n-butyltin diacetate, and the like, can be incorporated into the reaction mixture. The reaction takes place smoothly at temperatures of from about 15 to about 50° C.; preferably, the reaction is carried out at temperatures of from about 20 to about 30° C. The pressure employed is not critical and the reaction is usually carried out at ambient atmospheric pressure.

In carrying out the reaction, the haloalkoxy- or haloalkylthio- phenol or thiophenol reactant and actuating agent are usually dispersed in a reaction medium as described and a portion of the selected iso- or isothiocyanate reactant added dropwise thereto over a period of from about 5 to about 15 minutes. The reaction mixture is agitated at ambient temperatures for a period of from about 1 to about 4 hours and the remaining portion of the selected iso- or isothio- cyanate reactant is added as previously described. The resulting reaction mixture is agitated for an additional period of from about 1 to about 30 hours in order to assure substantial completion of the reaction. Following the completion of the reaction, the carrier medium is removed in vacuo and the solid or liquid residue thus obtained is dissolved in an appropriate organic solvent, such as, for example, one of those hereinbefore mentioned. The resulting solution is washed with aqueous potassium carbonate, dried, and the organic solvent removed in vacuo. The product residue thus obtained can be further purified by conventional procedures such as recrystallization, distillation under reduced pressure, vapor phase chromatography and the like.

In a further embodiment of the present invention the compounds wherein R and R' each represent a loweralkyl radical as described can be prepared by reacting an appropriate haloalkoxy- or haloalkylthio- phenol or thiophenol reactant, in the form of the sodium or potassium salt, with phosgene ($COCl_2$) in the presence of a suitable solvent such as, for example, benzene, toluene and the like to give the corresponding chloroformate ester. The ester thus obtained can then be reacted with an appropriate diloweralkylamine in a solvent such as dioxane or with an aqueous solution of an appropriate diloweralkylamine at ambient temperatures to give the desired N,N-diloweralkyl carbamate product. In an alternative procedure, the desired N,N-diloweralkyl carbamate can be prepared by reacting the above-described phenol or thiophenol reactant with a diloweralkyl carbamoyl chloride in refluxing pyridine.

The desirable properties of the products of the present invention are inherent in the pure compounds; when highly selective properties are to be relied upon, the purified compounds will be preferred. However, for many applications, incompletely purified products can be used if desired.

DESCRIPTION OF THE PREFERRED EMBODIMENTS

The following examples illustrate the present invention but are not be construed as limiting the same.

Example 1

A solution of methyl isocyanate (1.4 grams; 0.02 mole) in 25 milliliters of acetonitrile was added, by dropwise addition over a period of from about 5 to about 10 minutes, to a solution of 4-(2,2-dichloro-1,1-difluoro-1,1-difluoroethoxy)phenol (5.0 grams; 0.02 mole) and di-n-butyltin diacetate (5 drops; approximately 0.1 gram) in 25 milliliters of acetonitrile. After agitating the reaction mixture for a period of about three hours at ambient temperatures, additional methyl isocyanate (0.90 gram; 0.01 mole) was added by dropwise addition over a period of about 5 minutes and the resulting reaction mixture was agitated at ambient temperatures for about 20 hours. Following the completion of the reaction, the acetonitrile solvent was removed in vacuo and the product residue dissolved in 60 milliliters of carbon tetrachloride. The resulting solution was washed with 5% aqueous potassium carbonate and dried. Removal of the carbon tetrachloride in vacuo left a solid residue which was recrystallized from cyclohexane. As a result of these operations, the desired 4-(2,2-dichloro-1,1-difluoroethoxy)phenyl methylcarbamate product was obtained as a white crystalline solid melting at 81–83° C.

In view of the foregoing teachings and example, the following haloalkoxy- and haloalkylthio-phenyl carbamate compounds are prepared by reacting the appropriate haloalkoxy- or haloalkylthio- phenol or thiophenol starting compound with the appropriate substituted iso- or isothiocyanate reactant or phosgene and a diloweralkyl amine reactant.

| Example No. | Name of product | Identifying characteristic of product |
|---|---|---|
| 2 | 3-(2,2-dichloro-1,1-difluoroethoxy) phenyl methylcarbamate.[1] | M.W. 300.91. |
| 3 | 4-(2,2-dichloro-1,1-difluoroethoxy)-2-nitrophenyl methylcarbamate.[1] | M.W. 345.088. |
| 4 | 2-chloro-5-(2,2-dichloro-1,1-difluoroethoxy)phenyl methylcarbamate. | M.P. 69–70° C. |
| 5 | 4-(2,2-dichloro-1,1-difluoroethoxy)-2,6-diiodophenyl methylcarbamate. | M.P. 148–150° C. |
| 6 | 2,6-dibromo-4-(2,2-dichloro-1,1-difluoroethoxy)phenyl methylcarbamate. | M.P. 123.5–125° C. |
| 7 | 2-(2,2-dichloro-1,1-difluoroethoxy) phenyl methylcarbamate. | M.P. 74–75° C. |
| 8[2] | 4-tert.-butyl-2-(2,2-dichloro-1,1-difluoroethoxy)phenyl methylcarbamate. | M.W. 356.199. |
| 9 | 3-(2,2-dichloro-1,1-difluoroethoxy) phenyl N,N'-di-n-propylcarbamate. | M.W. 370.226. |
| 10 | 3-(2-bromo-1,1,2-trifluoroethoxy) phenyl ethylcarbamate. | M.W. 342.120. |
| 11 | S-(2-(2-bromo-1,1,2-trifluoroethoxy) phenyl ethylthiocarbamate. | M.W. 358.185. |
| 12 | 4-(2,2,2-trichloro-1,1-difluoroethoxy) phenyl N,N'-diethylcarbamate. | M.W. 376.618. |
| 13 | 3-(2-bromo-1,1,2-trifluoroethylthio) phenyl ethylcarbamate. | M.W. 358.185. |
| 14 | S-(3-(2-bromo-1,1,2-trifluoroethylthio) phenyl)methyldithiocarbamate. | M.W. 376.286. |
| 15 | 2,4,6-trichloro-3-(2,2-dichloro-1,1-difluoroethoxy)phenyl n-butylcarbamate. | M.W. 445.508. |
| 16 | 2,4,6-trichloro-3-(2-bromo-1,1,2-trifluoroethylthio)phenyl N,N'-di n-propylcarbamate. | M.W. 517.628. |
| 17 | 3,5-dichloro-2-(2,2-dichloro-1,1-difluoroethoxy)phenyl ethylcarbamate. | M.W. 383.009. |
| 18 | S-(2,6-dichloro-4-(2,2,2-trichloro-1,1-difluoroethylthio)phenyl)methyldithiocarbamate. | M.W. 451.620. |
| 19 | 3-(2,2-dichloro-1,1-difluoroethoxy)-2,4,6-trifluorophenyl n-butylcarbamate. | M.W. 396.144. |
| 20 | 2-(2-bromo-1,1,2-trifluoroethylthio)-3,5-difluorophenyl N,N'-diethylcarbamate. | M.W. 422.220. |
| 21 | 2,4,6-tribromo-3-(2-bromo-1,1,2-trifluoroethylthio)phenyl n-butylcarbamate. | M.W. 565.947. |
| 22 | S-(3,5-dibromo-2-(2,2-dichloro-1,1-difluoroethoxy)phenyl)methylthiocarbamate. | M.W. 473.958. |
| 23 | 3-(2,2-dichloro-1,1-difluoroethoxy)-2,4,6-triiodophenyl N,N'-diethylcarbamate. | M.W. 719.862. |
| 24 | O-(2-(2-bromo-1,1,2-trifluoroethoxy)-3,5-diiodophenyl)methylthiocarbamate. | M.W. 595.950. |
| 25 | 5-(2,2,2-trichloro-1,1-difluoroethylthio)-2-iodophenyl methylcarbamate. | M.W. 476.497. |
| 26 | 4-(2-bromo-1,1,2-trifluoroethoxy)-2,6-dinitrophenyl N,N'-di-n-propylcarbamate. | M.W. 488.222. |
| 27 | O-(3-(2-chloro-1,1,2-trifluoroethylthio)-2,4,6-trinitrophenyl)methylthiocarbamate. | M.W. 450.758. |
| 28 | S-(2-(2-dichloro-1,1-difluoroethoxy)-3,5-dinitrophenyl)ethyldithiocarbamate. | M.W. 436.243. |
| 29 | 3-(2,2-dichloro-1,1-difluoroethoxy)-2,4,6-tri-n-propylphenyl N,N'-di-n-butylcarbamate. | M.W. 524.525. |
| 30 | 2-(2-bromo-1,1,2-trifluoroethylthio)-3,5-dimethylphenyl methylcarbamate. | M.W. 372.212. |
| 31 | O-(4-(2,2,2-trichloro-1,1-difluoroethylthio)-2,6-diethylphenyl)methylthiocarbamate. | M.W. 422.774. |
| 32 | S-(5-(2,2-dichloro-1,1-difluoroethoxy)-2-methylphenyl)methyldithiocarbamate. | M.W. 346.248. |
| 33 | 2,4-dichloro-3-(2,2-dichloro-1,1-difluoroethoxy)-6-fluorophenyl methylcarbamate. | M.W. 386.971. |
| 34 | 3-(2-bromo-1,1,2-trifluoroethylthio)-2,4-diethyl-6-nitrophenyl N,N'-diethylcarbamate. | M.W. 471.279. |
| 35 | 2-(2-chloro-3-(2-bromo-1,1,2-trifluoroethoxy)-4,6-dinitrophenyl)methylthiocarbamate. | M.W. 468.596. |
| 36 | O-(2-bromo-3-(2,2-dichloro-1,1-difluoroethoxy)-4-ethyl-6-nitrophenyl) methylthiocarbamate. | M.W. 468.109. |
| 37 | 3-bromo-2-(2,2-dichloro-1,1-difluoroethoxy)-5-fluorophenyl methylcarbamate. | M.W. 396.982. |
| 38 | O-(2-(2-bromo-1,1,2-trifluoroethylthio)-3-tert.-butyl-5-nitrophenyl) methylthiocarbamate. | M.W. 447.321. |
| 39 | S-(3-chloro-2-(2,2,2-trichloro-1,1-difluoroethoxy)-5-nitrophenyl)methyldithiocarbamate. | M.W. 446.107. |
| 40 | 3-chloro-2-(2,2-dichloro-1,1-difluoroethoxy)-5-tert.-butylphenyl N,N'-diethylcarbamate. | M.W. 432.726. |

[1] Oil; decomposes at temperatures above 70° C.
[2] 1:1 mixture with 5-tert.-butyl-2-(2,2-dichloro-1,1-difluoroethoxy) phenyl methylcarbamate.

NOTE.—M.W.=Molecular weight; M.P.=Melting point.

The products of the present invention are suitable for uses as herbicides, fungicides and insecticides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plants, insects or fungal organisms. The exact concentration of the toxic substituent to be employed in the treating compositions is not critical and may vary considerably provided the plant, insect or fungal organism and/or their respective habitats are contacted with an effective amount of the toxicant. The concentration of the toxicants in liquid compositions generally is from about 1.0 to about 50 percent by weight. Concentrations up to about 95 weight percent are often employed. In dusts or dry formulations, the concentration of the toxicant can be from about 1.0 to about 10 weight percent; however, conveniently employed. In compositions to be employed as concentrates, the toxicant can be present in a concentration of from about 5 to about 98 weight percent.

In represeentative operations, numerous compositions containing 500 parts of one of the compounds of the present invention as sole toxicant per million parts by weight of ultimate treating composition were prepared and separately applied to the environments containing and supporting thriving members of one of a variety of fungal organisms. The results of the evaluations of the compounds tested at the above concentration and the percent control of the organisms treated are set forth in the following Table II.

reaction mixture in order to decrease reaction time. Following the addition of the halogenating or nitrating agent, the reaction mixture is agitated at ambient temperatures for a period of from about 1 to about 18 hours, filtered, and washed with water, dilute hydrochloric acid, and the like and dried. Evaporation of the reaction mixture under reduced pressure leaves the desired product as a solid or viscous residue which can be further purified by employing conventional techniques.

The unsubstituted haloalkoxy- or haloalkylthiophenol or thiophenol compounds employed in the halogenating and nitrating reactions above can be prepared by known or analogous procedures disclosed in the literature. For example, 3 - (2,2 - dichloro-1,1-difluoroethoxy)phenol is prepared by the reaction of resorcinol, 1,1-dichloro-2,2-difluoroethylene and potassium hydroxide in the presence of acetone. The 1,1-dichloro-2,2-difluoroethylene reactant is usually sparged into a mixture of the other reactants

TABLE II

| Compound Number | Subject compound | Percent control and kill of— | | | | | | | | | |
|---|---|---|---|---|---|---|---|---|---|---|---|
| | | S.a. | C.a. | T.m. | B.s. | A.t. | C.p. | P.p. | M.p. | R.n. | C.f. |
| 1 | 4-(2,2-dichloro-1,1-difluoroethyoxy)phenyl methylcarbamate. | 50 | | | | | | | 100 | | |
| 2[1] | 4-(2,2-dichloro-1,1-difluoroethoxy)-2-nitrophenyl methylcarbamate. | 100 | 100 | 100 | 100 | 100 | 100 | 100 | 100 | 100 | 100 |
| 3 | 2-chloro-5-(2,2-dichloro-1,1-difluoroethoxy)phenyl methylcarbamate. | 100 | 100 | 100 | 100 | 100 | 100 | 100 | 100 | 100 | 100 |
| 4 | 3-(2,2-dichloro-1,1-difluoroethoxy)phenyl methylcarbamate. | 100 | 100 | 100 | 100 | 100 | 100 | 100 | 100 | 100 | 100 |
| 5 | 4-(2,2-dichloro-1,1-difluoroethoxy)-2,6-diiodophenyl methylcarbamate. | 100 | 100 | 100 | 100 | 100 | 100 | 100 | 100 | 100 | 100 |
| 6 | 2-(2,2-dichloro-1,1-difluoroethoxy)phenyl methylcarbamate. | 100 | 100 | 100 | 100 | 100 | 100 | 100 | 100 | 0 | 100 |
| 7[2] | 4-tert.-butyl-2-(2,2-dichloro-1,1-difluoroethoxy)phenyl methyl carbamate. | 50 | 0 | 100 | 100 | 0 | 0 | 0 | 100 | 0 | 0 |

[1] Admixture with 35% 4-(2,2-dichloro-1,1-difluoroethyxy)-2-nitrophenol.
[2] Admixture with 50% 5-tert.-butyl-2-(2,2-dichloro-1,1-difluoroethoxy)phenyl methylcarbamate.

NOTE.—S.a.=Staphylococcus aureus, C.a.=Candida albicans, T.m.= Trichophyton mentagrophytes, B.s.=Bacillus subtilis, A.t.=Aspergillus terreus, C.p.=Candida pelliculosa, P.p.=Pullalaria pullulans, M.p.=Mycobacterium phlei, R.n.=Rhizopus nigricans, C.f.=Cephalascus fragrans.

In further representative operations, each of the 2-(2,2-dichloro - 1,1 - difluoroethoxy)phenyl methylcarbamate and 3 - (2,2 - dichloro-1,1-difluoroethoxy)phenyl methylcarbamate compounds gives complete control of pigweeds and wild mustard-charlock when such plants are contacted with compositions containing one of the above-named compounds at a dosage rate of 20 pounds per acre.

In additional representative operations, 3-(2,2-dichloro-1,1-difluoroethoxy)phenyl methylcarbamate gives complete control of copper and black blowflies when such insects are contacted with a composition containing the above compound at a concentration of 10 parts per million by weight.

In other representative operations, 2,6-dibromo-4-(2,2-dichloro - 1,1 - difluoroethoxy)phenyl methylcarbamate gives substantially complete control of downy mildew and rootknot nematodes when such organisms are contacted with compositions containing the above compound at concentrations of 400 and 50 parts per million by weight respectively.

The haloalkoxy- or haloalkylthio-phenol or thiophenol compounds employed as starting materials in the present invention are prepared by halogenating or nitrating a corresponding unsubstituted haloalkoxy- or haloalkylthiophenol or thiophenol compound or a fluoro and/or loweralkyl-substituted haloalkoxy- or haloalkylthiophenol or thiophenol compound.

The addition of the halogenating or nitrating agent is conveniently carried out in the presence of an inert solvent, such as, for example, acetone, carbon tetrachloride, methylene chloride and the like, at temperatures of from about 0 to about 60° C. over a period of from about 10 minutes to about three hours. Ordinarily, a small amount of an actuating agent, e.g., ferric chloride, aluminum chloride, iodine and the like, is incorporated into the at a temperature of from about 0 to about 10° C. over a period of about two hours. Following the completion of the reaction the solvent is removed by evaporation under reduced pressure and the residue thus obtained is dissolved in 10% aqueous potassium hydroxide and subsequently filtered. The aqueous solution is acidified with dilute hydrochloric acid extracted with carbon tetrachloride and the extract dried over magnesium sulfate. Removal of the carbon tetrachloride solvent by distillation gives the desired 3-(2,2 - dichloro-1,1-difluoroethoxy)phenol product as an oil having a boiling point of 108–109° C. at 0.2 millimeters of Hg.

The loweralkyl-substituted haloalkoxy- or haloalkylthio- phenol or thiophenol starting materials are prepared in analogous procedures by reacting a loweralkyl-substituted catechol, resorcinol or hydroquinone compound with a substituted difluoroethylene compound.

The fluoro-substituted or fluoro and loweralkyl-substituted haloalkoxy- or haloalkylthio- phenol or thiophenol compounds employed in the halogenating and nitrating reactions above are prepared by introducing the fluorine atom into the ring prior to the preparation of the ether. These compounds are prepared from a fluoro- or a fluoro- and loweralkyl-substituted catechol, resorcinol or hydroquinone compound according to the procedures set forth in Illinois State Geological Circular #199, pp. 15 (1955). Other modes of substitution are readily arrived at by the synthesis of ortho-, meta-, or para-fluoro-(2,2-dihalo-1,1-difluoroethoxy)benzene compounds from corresponding fluorophenols followed by nitration, reduction, diazatization, hydrolysis and the like.

The loweralkyl-substituted catechol, resorcinol and hydroquinone compounds and the substituted difluoroethylene compounds employed above in the preparation of starting materials, and the substituted iso- and isothiocyanates, substituted acetates, and diloweralkyl-amines or -carbamoyl chlorides employed as starting materials for the compounds of the present invention can be prepared by known or analogous methods disclosed in the literature or readily obtained from commercial sources.

Compounds containing the $CX_3CF_2Y-$ moiety, wherein X represents bromo or chloro, are readily prepared by photochemically halogenating known compounds of the type

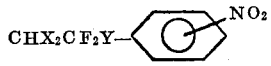

(See Lichtenberger et al., Bull, Soc, Chim. Fr., 4, 581–596 (1957)) with an appropriate halogenating agent, such as, for example, $Cl_2$, ClBr and the like, in the presence of a solvent such as carbon tetrachloride or a heterogeneous mixture employing water.

The compounds wherein X is fluoro are prepared by reacting the compounds wherein X is bromo or chloro with a molten antimony fluoro-chloro compound at a temperature of from about 80–120° C. for a period of from about ½ to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

What is claimed is:

1. A compound corresponding to the formula:

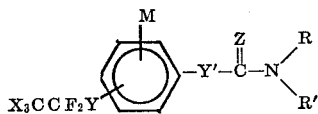

wherein each X independently represents hydrogen, bromo, chloro or fluoro, with the proviso that at least one X is always bromo, chloro or fluoro;

Y, Y' and Z each independently represents oxygen or sulfur;

each M independently represents bromo, chloro, fluoro, iodo, nitro or loweralkyl containing from 1 to 4 carbon atoms, both inclusive;

$a$ represents an integer of from 0 to 3, both inclusive, and

R and R' each independently represents hydrogen or loweralkyl containing from 1 to 4 carbon atoms, both inclusive.

2. A compound according to claim 1 which is 4-(2,2-dichloro-1,1-difluoroethoxy)phenyl methylcarbamate.

3. A compound according to claim 1 which is 3-(2,2-dichloro-1,1-difluoroethoxy)phenyl methylcarbamate.

4. A compound according to claim 1 which is 2-chloro-5-(2,2 - dichloro-1,1-difluoroethoxy)phenyl methylcarbamate.

5. A compound according to claim 1 which is 4-(2,2-dichloro-1,1-difluoroethoxy)-2,6-diiodophenyl methylcarbamate.

6. A compound according to claim 1 which is 2,6-dibromo-4-(2,2-dichloro-1,1-difluoroethoxy)phenyl methylcarbamate.

7. A compound according to claim 1 which is 2-(2,2-dichloro-1,1-difluoroethoxy)phenyl methylcarbamate.

References Cited

UNITED STATES PATENTS 3,651,129   3/1972   Weil _____ 260—479

FOREIGN PATENTS 1,183,490   12/1964   Germany _____ 260—479

JAMES A. PATTEN, Primary Examiner

U.S. Cl. X.R.

71—100, 113; 260—455 A, 609 D, 609 E, 612 D, 613 D; 424—300

UNITED STATES PATENT OFFICE
CERTIFICATE OF CORRECTION

Patent No. 3,714,233     Dated January 30, 1973

Inventor(s) Eric R. Larsen, Lennon H. McKendry, and Fred Y. Edamura

It is certified that error appears in the above-identified patent and that said Letters Patent are hereby corrected as shown below:

Column 1, line 52, after "chloro" insert ---or---.

Column 3, line 21 or 22, delete repeated "1,1-difluoro".

Column 3, tabular list of examples, insert footnote reference "1" after the Examples numbered 2 and 3.

Column 4, Example 35, prefix "2" should be "S".

Column 5, line 5, after "however," insert ---concentrations up to about 95 weight percent are often---.

Column 6, TABLE II footnote, "Cephalascus" should be "Cephaloascus".

Column 7, formula of Claim 1, the bond between ring positions 6 and 1 should be to $M_a$ instead of "M". The correct formula is as follows:

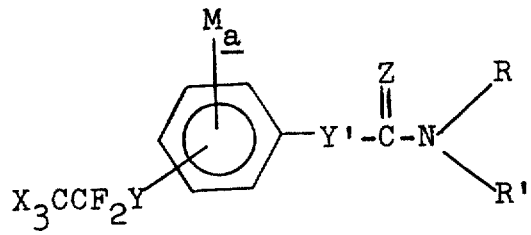

Signed and sealed this 24th day of September 1974.

(SEAL)
Attest:

McCOY M. GIBSON JR.
Attesting Officer

C. MARSHALL DANN
Commissioner of Patents